United States Patent
Fullman et al.

(10) Patent No.: US 11,636,459 B2
(45) Date of Patent: Apr. 25, 2023

(54) METHODS AND SYSTEMS FOR AUTONOMOUS DISPENSING OF PRODUCTS

(71) Applicants: Edward A. Fullman, Cincinnati, OH (US); Benjamin V. Savage, Lebanon, OH (US); Saurabh Sarkar, Mason, OH (US); Dave Doster, Mason, OH (US); George Hoffman, Cincinnati, OH (US)

(72) Inventors: Edward A. Fullman, Cincinnati, OH (US); Benjamin V. Savage, Lebanon, OH (US); Saurabh Sarkar, Mason, OH (US); Dave Doster, Mason, OH (US); George Hoffman, Cincinnati, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

(21) Appl. No.: 16/553,748

(22) Filed: Aug. 28, 2019

(65) Prior Publication Data

US 2020/0074440 A1 Mar. 5, 2020

Related U.S. Application Data

(60) Provisional application No. 62/723,786, filed on Aug. 28, 2018.

(51) Int. Cl.
*G06Q 20/32* (2012.01)
*G06Q 20/18* (2012.01)
(Continued)

(52) U.S. Cl.
CPC ......... *G06Q 20/3226* (2013.01); *G06Q 20/18* (2013.01); *G06Q 20/401* (2013.01); *G06Q 10/0832* (2013.01); *G06Q 2220/00* (2013.01)

(58) Field of Classification Search
None
See application file for complete search history.

(56) References Cited

U.S. PATENT DOCUMENTS 5,960,411 A 9/1999 Hartman et al.
10,318,747 B1 6/2019 MacCárthaigh et al.
(Continued)

FOREIGN PATENT DOCUMENTS

WO 2017/167399 A9 10/2017

OTHER PUBLICATIONS

Greenspan, G. "Blockchains vs centralized databases", Multichain, https://www.multichain.com/blog/2016/03/blockchains-vs-centralized-databases/ (Mar. 17, 2016).

(Continued)

*Primary Examiner* — Namrata Boveja
*Assistant Examiner* — Amit Patel
(74) *Attorney, Agent, or Firm* — Thompson Hine LLP

(57) ABSTRACT

Systems and methods for autonomously dispensing items. A dispensing system receives a first distributed ledger transaction that: i) identifies an item, ii) identifies a container associated with and containing the item, iii) includes a status indicator in a first state identifying the item as present in the container, and iv) includes an authorization code associated with a mobile device. The authorization code is received from the mobile device. The dispensing system creates a second distributed ledger transaction based on the first distributed ledger transaction that changes the status indicator to a second state identifying the item as authorized for dispensing. Responsive to the creation of the second distributed ledger transaction, access is autonomously provided to the item. The dispensing system creates a third distributed ledger transaction based on the second distributed ledger (Continued)

transaction that changes the status indicator to a third state identifying the item as dispensed.

18 Claims, 10 Drawing Sheets

(51) Int. Cl.
  *G06Q 20/40* (2012.01)
  *G06Q 10/08* (2012.01)
  *G06Q 10/0832* (2023.01)

(56) References Cited

U.S. PATENT DOCUMENTS

| | | |
|---|---|---|
| 11,062,305 B2 | 7/2021 | Schiatti et al. |
| 2016/0200517 A1 | 7/2016 | Savage et al. |
| 2017/0046651 A1 | 2/2017 | Lin et al. |
| 2017/0132393 A1 | 5/2017 | Natarajan et al. |
| 2017/0206522 A1 | 7/2017 | Schiatti et al. |
| 2017/0236094 A1 | 8/2017 | Shah |
| 2017/0236121 A1 | 8/2017 | Lyons |
| 2017/0279783 A1 | 8/2017 | Milazzo et al. |
| 2017/0262862 A1 | 9/2017 | Aljawhari |
| 2017/0317833 A1 | 11/2017 | Smith et al. |
| 2017/0353320 A1 | 12/2017 | Yang |
| 2018/0048738 A1 | 2/2018 | Hinds |
| 2018/0094953 A1 | 4/2018 | Colson et al. |
| 2018/0096175 A1 | 4/2018 | Schmeling et al. |
| 2018/0130034 A1 | 5/2018 | Taylor |
| 2018/0189730 A1 | 7/2018 | Wilkinson et al. |
| 2018/0198624 A1 | 7/2018 | Bisti |
| 2018/0205682 A1 | 7/2018 | O'Brien et al. |
| 2018/0211213 A1* | 7/2018 | Vivier .................. H04L 9/3239 |
| 2018/0232526 A1 | 8/2018 | Reid et al. |
| 2020/0118086 A1* | 4/2020 | Achkir .................. G06Q 20/10 |

OTHER PUBLICATIONS

Webpage featuring "Hyperledger Fabric Capabilities", Hyperledger Fabric Documentation, Hyperledger project, https://hyperledger-fabric.readthedocs.io/en/v1.0.5/capabilities.html (2017).

Higgins, S. "Oracle Plans Blockchain 'Pipelines' to Boost Employee Efficiency", Coindesk, https://www.coindesk.com/oracle-plans-blockchain-pipelines-to-boost-employee-efficiency (May 2, 2017).

Iyer, S. "The Benefits of Blockchain Across Industries", Oracle Profit Magazine, Big Ideas, https://blogs.oracle.com/profit/the-benefits-of-blockchain-across-industries (Apr. 2016).

Lucas, M. Building a Blockchain PoC in Ten Minutes Using Hyperledger Composer, InofQ, https://www.infoq.com/articles/blockchain-poc-hyperledger/ (Jun. 17, 2017).

PCT, International Search Report and Written Opinion, International Application No. PCT/US2019/048448 (dated Nov. 8, 2019).

European Patent Office, Search Report and Search Opinion, European Patent Application No. 19853416.6, 9 pages, dated Apr. 28, 2022.

* cited by examiner

METHODS AND SYSTEMS FOR AUTONOMOUS DISPENSING OF PRODUCTS

This application claims priority to U.S. Provisional Patent Application Ser. No. 62/723,786 filed on Aug. 28, 2018 and entitled METHODS AND SYSTEMS FOR AUTONOMOUS DISPENSING OF PRODUCTS, the entire contents of which are hereby incorporated by reference.

BACKGROUND

Sellers of various goods, such as retail operations, grocery stores, restaurant/food service and other sales and/or delivery operations are increasing utilizing self-service pick-up options for goods. The orders for such goods can in some cases be placed remotely and by any of a variety of methods, such as call-ahead, internet/web site ordering and/or mobile device ordering. Some retailers/operations accommodate pre-payment such that the customer need only provide proof of purchase before taking possession of the purchased items. Such pre-payment can avoid the need for on-site interaction with or monetary exchange with store personnel.

Efficiently fulfilling these remotely-initiated orders for in-store pickup can create a logistical challenge. In some existing settings, remote-order customers must wait in line with other customers upon arrival at the store, despite that their orders are already prepared and ready for pick-up. In addition, when a remote-order customer reaches the point of sale workstation, the cashier may be required to step away from the workstation to retrieve the order and confirm payment status before locating and delivering the appropriate product to the customer. This increases wait time for all customers. In some cases, businesses may increase staffing to provide fulfillment of such remote orders with dedicated personnel, which can impose a burden on store resources.

More specifically, the security, of the fulfillment of an order to an authorized recipient (e.g. the end user or customer) is paramount to all the participants in the fulfillment process. The contents being conveyed may be of an extremely valuable nature. The contents may be hazardous or otherwise dangerous when mishandled or misused. In other cases, the contents may be perishable or of a specific formula or recipe where alteration could affect quality and value of the contents or the safety of the recipient. Ensuring that the end user recipient is authorized to receive the contents, the terms and conditions of the fulfillment process have been met, and the recipient has received and is in possession of the contents is critical to the quality and confidence in the fulfillment and automated dispensing process.

Multiple parties participate in this supply chain: procuring, preparing, shipping, loading the order fulfillment system, dispensing the contents of the order fulfillment system, and finally receiving the contents of the order fulfillment system. Traditionally, these steps are conducted within a centralized order and fulfillment system with a centralized database. The number of steps and participants in the process, the cumbersome process and disaggregated authority to determine and gain consensus that the terms and conditions of the process have been met, and other complexities make the order fulfillment and dispensing process very cumbersome, and difficult to ensure the satisfaction of the participants.

Liability and risk can be informally and unwittingly transferred between participants in the process to the detriment of the end-user and the participants. Formal hand offs from one party to another with paperwork is not always possible or practical and would introduce delays and error impacting customer satisfaction negatively. The integration of multiple systems to facilitate the process also leads to errors in the supply chain and dispensing process due to interruption of service related to lapses in operation the centralized technology, corruption of the data because of purpose or design, and other factors.

Also, within a centralized ordering and fulfillment model, it is normal that each time an order is placed, a step is completed, an identification is made, or other processes are executed, sensitive information is transmitted over the Internet, and is susceptible to being intercepted and decrypted. The order management systems receiving this information via the Internet are largely centralized database systems. The contents of a database are stored in the memory and disk of a particular computer system, and individuals with sufficient access to that system can destroy or corrupt the data within the database. As a result, the supply chain and dispensing process become dependent on the centralized human organization managing the database.

Further, the robustness of the supply chain and dispensing process is directly related to the economics of centralized database availability. High availability is achieved through a combination of expensive infrastructure and disaster recovery. A primary database runs on high-end hardware which is monitored closely for problems, with transactions replicated to a backup system in a different physical location. If the primary database fails, activity is shifted to the backup. This is an expensive and complex process to deliver. As a result, it is quite possible that a successful supply chain process could end with a dispensing process that fails. If the central database cannot be reached to receive the authorization to unlock the computer-controlled doors of an order fulfillment system, the contents are likely inaccessible.

SUMMARY

In an embodiment, a method for autonomously dispensing items is disclosed. The method includes a dispensing system receiving a first distributed ledger transaction that i) identifies an item, ii) identifies a container associated with and containing the item, iii) includes a status indicator in a first state identifying the item as present in the container, and iv) includes an authorization code associated with a mobile device. The authorization code is received from the mobile device. The dispensing system creates a second distributed ledger transaction based on the first distributed ledger transaction. The second distributed ledger transaction changes the status indicator to a second state identifying the item as authorized for dispensing. Responsive to the creation of the second distributed ledger transaction, access to the item is autonomously provided. The dispensing system creates a third distributed ledger transaction based on the second distributed ledger transaction. The third distributed ledger transaction changes the status indicator to a third state identifying the item as dispensed.

In an embodiment, a system for autonomously dispensing items is disclosed. The system includes a dispensing system, a processor operatively connected to the dispensing system, and a memory operatively connected to the processor. The memory comprising program code that upon execution by the processor cause the system to perform operations. The operations comprising the dispensing system receiving a first distributed ledger transaction that i) identifies an item, ii) identifies a container associated with and containing the item, iii) includes a status indicator in a first state identifying the item as present in the container, and iv) includes an authorization code associated with a mobile device. The authorization code is received from the mobile device. The dispensing system creates a second distributed ledger transaction based on the first distributed ledger transaction. The second distributed ledger transaction changes the status indicator to a second state identifying the item as authorized for dispensing. Responsive to the creation of the second distributed ledger transaction, access to the item is autonomously provided. The dispensing system creates a third distributed ledger transaction based on the second distributed ledger transaction. The third distributed ledger transaction changes the status indicator to a third state identifying the item as dispensed.

In an embodiment, a non-transitory computer-readable storage medium is disclosed. The non-transitory computer-readable storage medium comprising computer-readable instructions that upon execution by a processor of a computing device cause the computing device to perform operations. The operations comprising a dispensing system receiving a first distributed ledger transaction that i) identifies an item, ii) identifies a container associated with and containing the item, iii) includes a status indicator in a first state identifying the item as present in the container, and iv) includes an authorization code associated with a mobile device. The authorization code is received from the mobile device. The dispensing system creates a second distributed ledger transaction based on the first distributed ledger transaction. The second distributed ledger transaction changes the status indicator to a second state identifying the item as authorized for dispensing. Responsive to the creation of the second distributed ledger transaction, access to the item is autonomously provided. The dispensing system creates a third distributed ledger transaction based on the second distributed ledger transaction. The third distributed ledger transaction changes the status indicator to a third state identifying the item as dispensed.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
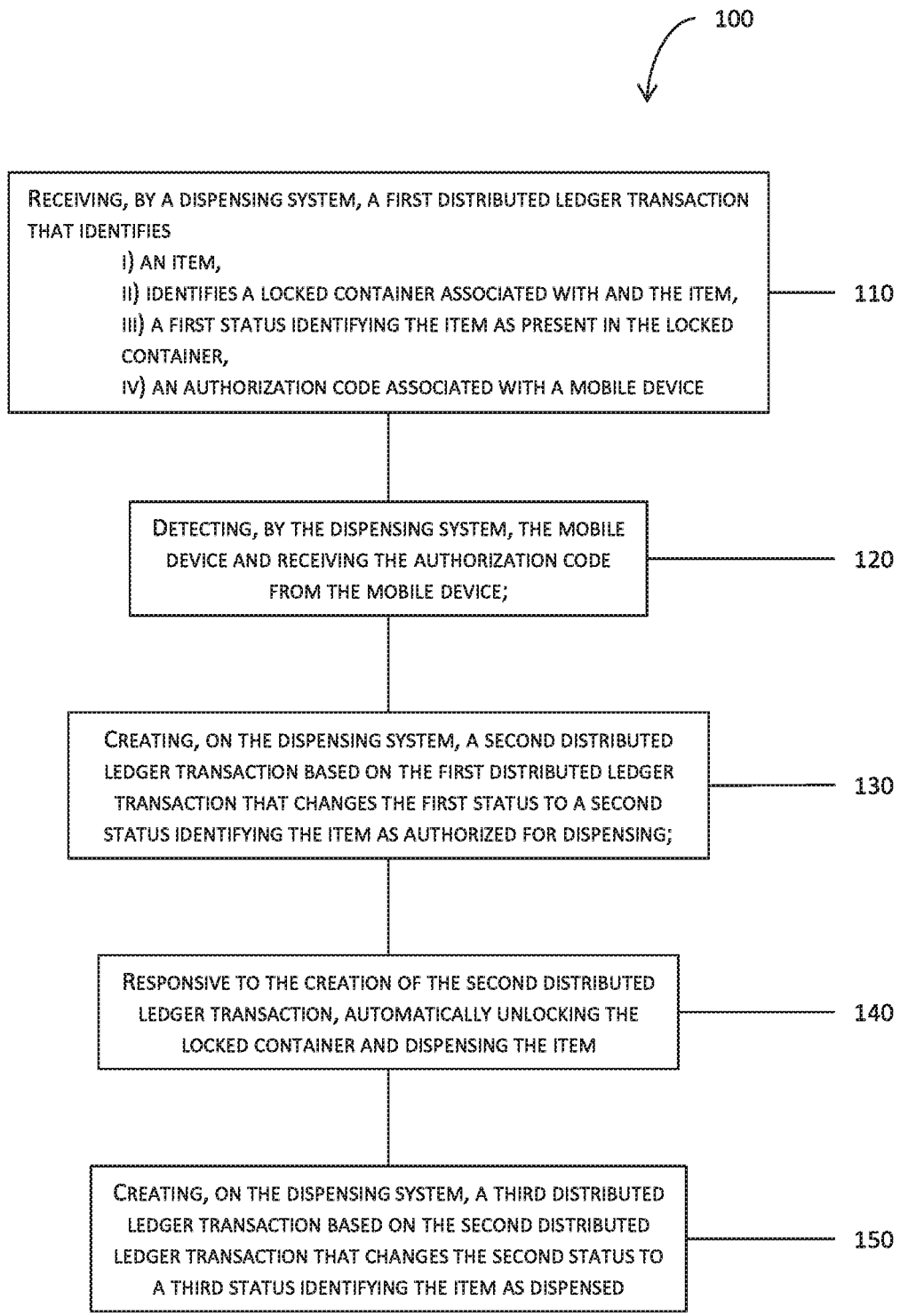
FIG. 1 is a flow diagram of a process for autonomously dispensing an item, in accordance with embodiments of the invention.

The present invention relates to autonomous product dispensation and more specifically to tracking and dispensation of products through blockchain transactions. With reference to FIG. 1, a process 100 for autonomously dispensing an item or asset is illustrated. At block 110, a dispensing system receives a distributed ledger transaction. The distributed ledger transaction identifies an item, a container associated with and containing the item, an authorization code associated with a mobile device, and a status indicator associated with the item. The status indicator associated with the item is used by an order fulfillment system (e.g., order fulfillment system 220 of FIG. 2) to determine a state of the item to be dispensed, such as whether the item is loaded and present in the container, whether the item is authorized for dispensation, and so on. At block 110, the status indicator associated with the item identifies the item as present in the container.

As used herein, an order fulfillment system may be any apparatus or system of apparatuses configured to autonomously dispense or provide access to an item (or asset). The order fulfillment system generally includes a computer device operatively coupled to the container. In an embodiment, the computer device is implemented using a computer system 222 described in greater detail below with respect to FIG. 10. The computer device is generally configured to autonomously provide access to an item disposed within a void defined by the container (such as by opening drawers or doors, etc.). The computer device autonomously provides access to the item using a copy of a distributed blockchain ledger that is shared and synchronized with other participants. As discussed in greater detail below, each participant is configured to independently manage a respective copy of the distributed blockchain ledger in a dispensing system, such as the systems 200 or 205 described in FIGS. 2 and 3, respectively.

The item may be any product, object, item or the like that can be physically disposed within the container or otherwise accommodated by the container. Examples of potential items include, but are not limited to, food, beverages, groceries, pharmaceuticals, retail merchandise, parts, components, work pieces, hardware, and the like. The container may be implemented using any type of container that can accommodate an item, such as a dispensing device, storage device, cabinet, drawer, locker, storage room, and the like. The container may be in a fixed location or may be a mobile container that can be transported from one location to another. As described in greater detail below, the container may be locked after the item has been loaded in the container or may already contain the item and may remain locked unless and until specifically unlocked for item dispensation.

In an embodiment, the computer device of the order fulfillment system autonomously provides access to the item by controlling a locking mechanism coupled to a container. For example, the computer device may control the locking mechanism by transitioning the locking mechanism from a locked state to an unlocked state (e.g. to unlock the container). As another example, the computer device may control the locking mechanism by transitioning the locking mechanism from an unlocked state to a locked state (e.g. to lock the container). In an embodiment, the container lacks a locking mechanism and the computer device of the order fulfillment system autonomously provides access to the item by refraining from activating an indication that items were improperly removed from the container.

In an embodiment, the order fulfillment system may be implemented as a single apparatus such as a vending machine that includes the computer device and the container. In an embodiment, the computer device of the order fulfillment system may be implemented using a separate computer device that is physically remote from an apparatus comprising the container. In this embodiment, the separate computer device may be operatively coupled (e.g. via a wireless or wired connection) with a locking mechanism coupled to the container, such as a remote storage locker or a locked cabinet in a hospital. In an embodiment, the locking mechanism may be operatively controlled directly by the computer device. In an embodiment, the locking mechanism may be operatively controlled indirectly by the computer device (e.g., via an intervening computer device operatively coupled with the computer device).

At block 120, the dispensing system receives the authorization code from the mobile device. The mobile device may transmit the authorization code using any known means, such as via signals transmitted over a local area network connection, radio-frequency transmissions communicated via a Bluetooth connection, a radio-frequency identification (RFID) tag, and the like. In an embodiment, the dispensing system receives the authorization code as part of an interaction triggered by an element (e.g., an order fulfillment system) of the dispensing system detecting the mobile device. In an embodiment, the dispensing system receives the authorization code as part of an interaction triggered by the mobile device detecting an element (e.g., an order fulfillment system) of the dispensing system.

The mobile device is generally configured to store the authorization code and transmit the authorization code to the dispensing system via an order fulfillment system. Examples of suitable computing devices for implementing the mobile device include: a mobile phone, computer, tablet computing device, or any specialized mobile device programmed to perform the operations disclosed herein. The authorization code may generally be stored in a memory of the mobile device, such as the memory of a mobile phone.

At block 130, the dispensing system creates another distributed ledger transaction based on the previous distributed ledger transaction. The new distributed ledger transaction changes a state of the status indicator associated with the item such that the new state of the status indicator identifies the item as authorized for dispensing. At block 140, in response to the creation of the new distributed ledger transaction identifying the item as authorized for dispensing, the dispensing system autonomously provides access to the item. For example, an order fulfillment system of the dispensing system may unlock the container, dispense the item, enable the item to be dispensed, or otherwise provide access to the item.

In an embodiment, a computer device of the order fulfillment system is configured to autonomously provide access to an item without obtaining a consensus among participants regarding a state of a status indicator associated with the item in the distributed blockchain ledger when a pecuniary value of the item is below a predefined threshold amount. For example, the computer device may autonomously provide access to the item without obtaining the consensus when a pecuniary value of the item is less than $100. In an embodiment, a computer device of the order fulfillment system is configured to autonomously provide access to an item upon obtaining a consensus among participants regarding a state of a status indicator associated with the item in the distributed blockchain ledger when a pecuniary value of the item exceeds a predefined threshold amount. For example, the computer device may autonomously provide access to the item upon obtaining a consensus when a pecuniary value of the item exceeds $200.

At block 150, the dispensing system creates another distributed ledger transaction based on the previously created transaction and changes the state of the status indicator associated with the item to identify the item as being dispensed. In an embodiment, the dispensing system creates the distributed ledger transaction at block 150 in response to a determination that the item is external to a void defined by the container.

Figure 2:
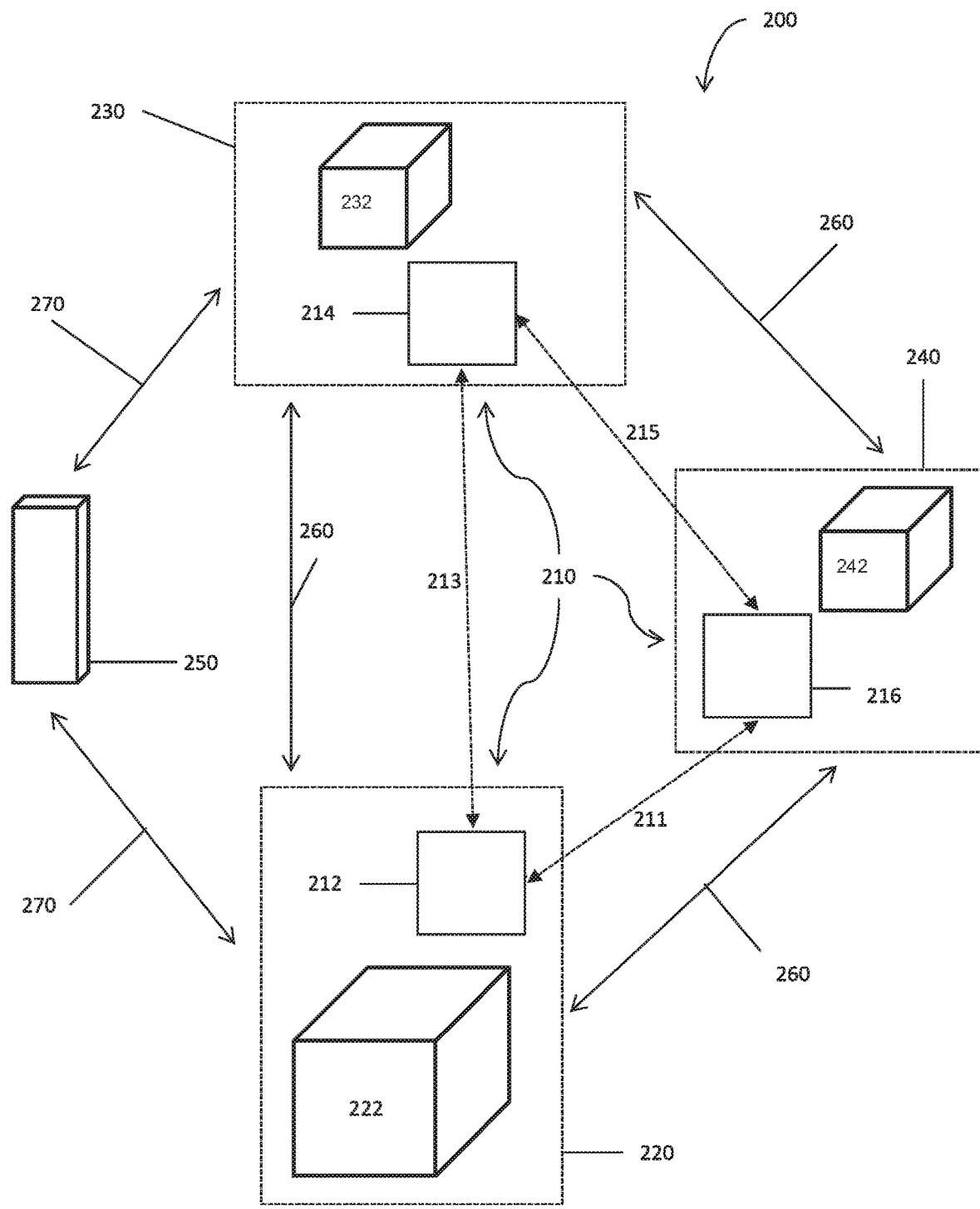
FIG. 2 is an exemplary schematic of a system for autonomously dispensing an item, in accordance with embodiments of the invention.

With reference to FIG. 2, one embodiment of a schematic of a secure dispensing system 200 for autonomously dispensing items is described. The dispensing system 200 includes a plurality of participants that are each configured to independently manage a copy of a distributed blockchain ledger 210. In FIG. 2, the plurality of participants includes an order fulfillment system 220, an order management system 230, and a preparer system 240. As shown in FIG. 2, each participant among the plurality of participants communicate via network connections 260. In an embodiment, communications between participants and mobile device 250 involve wireless connections 270.

The order fulfillment system 220 includes a computer system 222 and a copy 212 of the distributed blockchain ledger 200. The order fulfillment system 220 is configured to add and update distributed blockchain ledger transactions through copy 212 of the distributed blockchain ledger 210. As described herein, the order fulfillment system 220 is also configured to autonomously dispense an item or items responsive to interactions with and information received from mobile device 250.

The order management system 230 includes computer system 232 and a copy 214 of the distributed blockchain ledger 210. In operation, the order management system 230 is configured to add and update distributed blockchain ledger transactions through copy 214 of the distributed blockchain ledger 210.

The preparer system 240 includes a computer system 242 and a copy 216 of the distributed blockchain ledger 200. The preparer system 240 is configured to add and update distributed blockchain ledger transactions through copy 216 of the distributed blockchain ledger 210. In operation, the preparer system 240 provides a preparer with order information received from the order management system 230, via network connections 260. The preparer system 240 also provides a preparer with a mechanism for entering information regarding preparing and loading an item or items into a container of the order fulfillment system 220.

Mobile device 250 is generally configured (e.g., through a software application executing on mobile device 250) to facilitate with interactions between an end-user and dispensing system 200. For example, mobile device 250 may facilitate with an interaction between an end-user and the order management system 230 to place an order for an item via wireless connections 270. As another example, mobile device 250 may facilitate with an interaction between an end-user and the order fulfillment system 220 for exchanging information (e.g., an authorization code or other identification or verification information) via wireless connections 270 to signal to the order fulfillment system 220 that the item is authorized to be dispensed. In the embodiment shown in FIG. 2, the mobile device 250 is configured to interact with dispensing system 200 but does not also include a copy of the distributed blockchain ledger 210. For example, the mobile device 250 may communicate information to the order fulfillment system 220 and order management system 230 that may, in turn, be used by other systems to update respective copies 212, 214 of the distributed ledger 210.

Referring again to FIG. 2, each copy (e.g., copies 212, 214, and 216) of distributed blockchain ledger 210 passively synchronizes 211, 213, 215 with other copies of the distributed blockchain ledger 210 to retrieve the latest blocks created in the blockchain as the result of transactions being executed on the distributed blockchain ledger 210. Synchronizations 211, 213, 215 occur when an opportunity to connect over network connections 260 arises, or when a push (based on changes) synchronization or pull (scheduled) synchronization is initiated by any of participant systems 220, 230, 240. Some synchronizations may occur over static network connections 260. Other synchronizations occur opportunistically over cellular, Wi-Fi, or Blue Tooth Low Energy connections.

The order fulfillment system 220 thus can operate to autonomously dispense items to an end user without requiring a constant, static connection to other participants in the system 200. For example, in some instances, order fulfillment system 220 may autonomously provide access to an item without obtaining a consensus among participants regarding a state of a status indicator associated with the item in the distributed blockchain ledger 210. The order fulfillment system 220 may update its own copy 212 of the distributed blockchain ledger 210 and dispense an item or items even if the order fulfillment system 220 is temporarily disconnected from other participants in the system 200. When a connection is re-established, order fulfillment system 220 may synchronize its copy 212 with the other copies 214, 216 of the distributed blockchain ledger 210.

Figure 3:
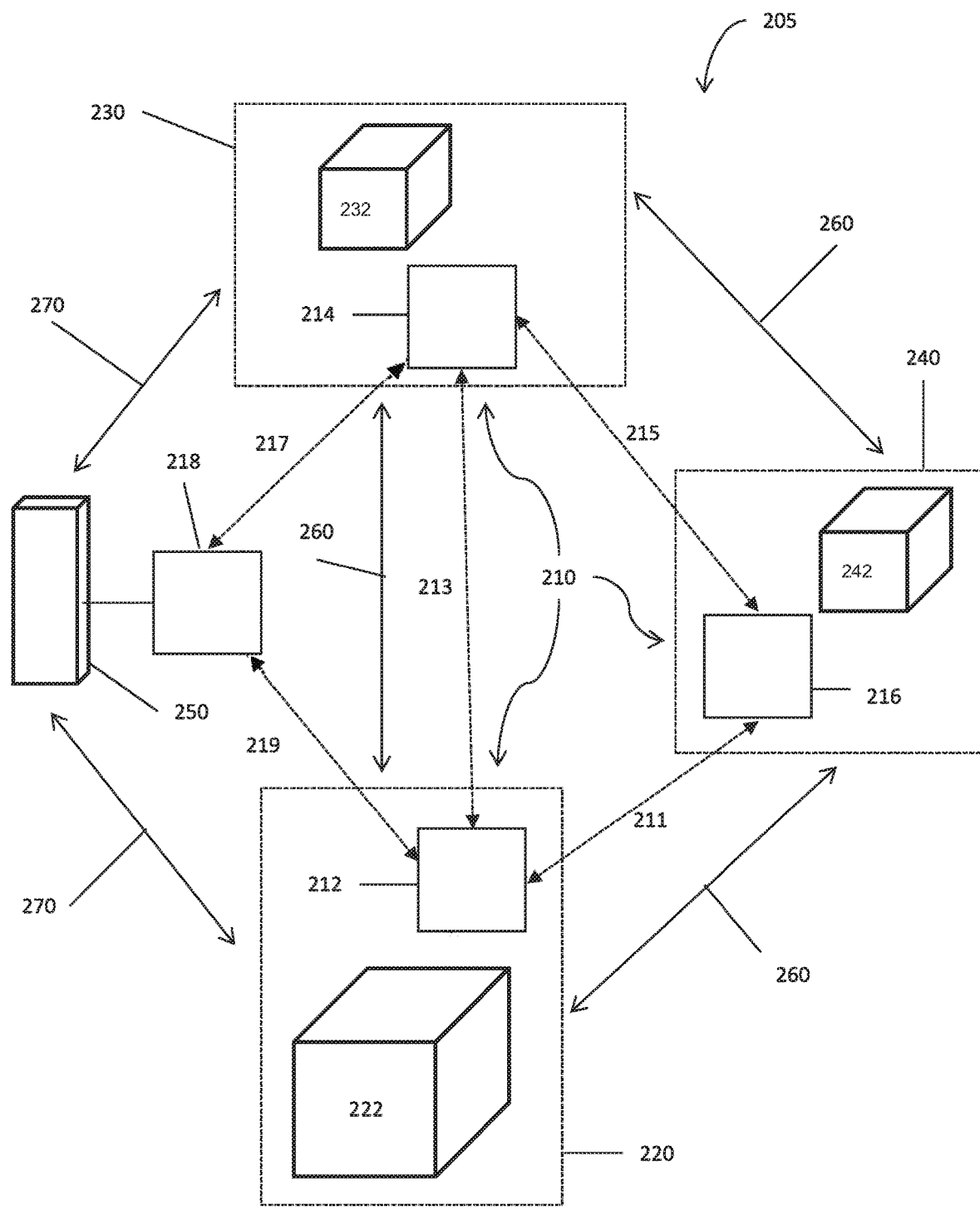
FIG. 3 is an exemplary schematic of a system for autonomously dispensing an item, in accordance with embodiments of the invention.

With reference to FIG. 3, another embodiment of a secure dispensing system 205 for autonomously dispensing an item is shown. System 205 is similar to system 200 depicted in FIG. 2, but with the addition of mobile device 250 as one of the plurality of participants that are each configured to independently manage a copy of a distributed blockchain ledger 210. In the embodiment shown, the mobile device 250 stores (or otherwise has access) to another copy 218 of the distributed blockchain ledger 210, allowing the mobile device 250 to add and update distributed blockchain ledger transactions via copy 218. Each copy (e.g., copies 212, 214, 216, and 218) of distributed blockchain ledger 210 passively synchronizes 211, 213, 215, 217, 219 with other copies of the distributed blockchain ledger 210 to retrieve the latest blocks created in the blockchain as the result of transactions being executed on the distributed blockchain ledger 210. Synchronizations 211, 213, 215, 217, 219 occur when an opportunity to connect over network connections 260 and/or wireless connections 270 arises, or when a push (based on changes) synchronization or pull (scheduled) synchronization is initiated by any of participant systems 220, 230, 240, 250. Some synchronizations may occur over static network connections 260. Other synchronizations may occur opportunistically over cellular, Wi-Fi, or Blue Tooth Low Energy connections 270.

Figure 4:
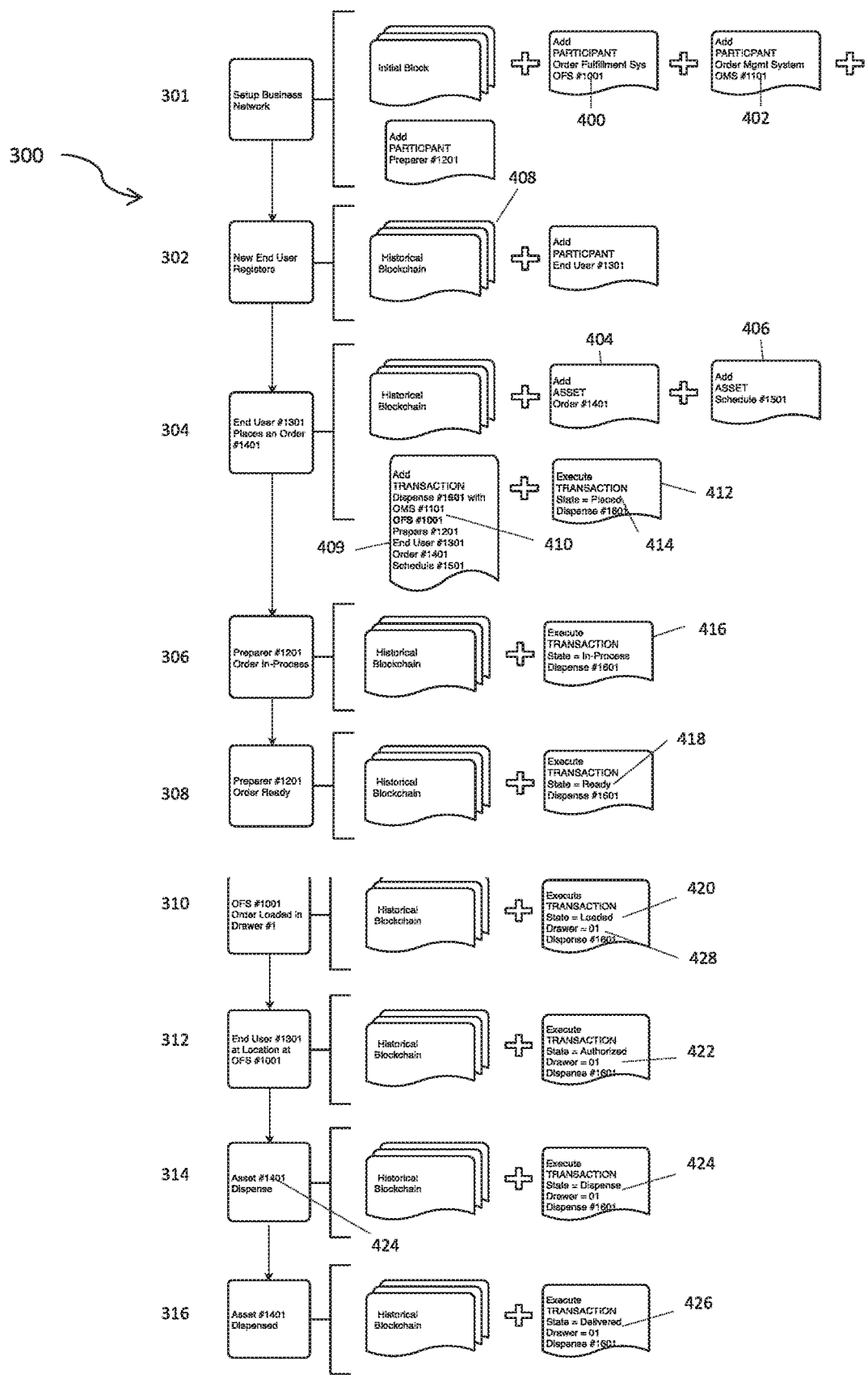
FIG. 4 is a flow diagram of a process for autonomously dispensing an item and associated distributed blockchain ledger transactions, in accordance with embodiments of the invention.

With reference to FIG. 4, an embodiment of a secure dispensing system (e.g., dispensing systems 200 or 205 of FIGS. 2 and 3, respectively) is configured to execute distributed blockchain ledger transactions as in the process 300 illustrated. The distributed blockchain ledger transactions associated with steps 301 thru 316 may be executed via applications on one or more participant systems (e.g., order fulfillment system 220, order management system 230, preparer system 240, and/or mobile device 250) that are relevant to their respective roles in the system.

In an embodiment, the distributed blockchain ledger transactions associated with steps 301 thru 316 are executed via applications that are integrated to the business network and are either automatic or manual in nature based on the role of a respective participant. In an embodiment, the business network of the secure dispensing system is managed by executing distributed blockchain ledger transactions that add participants at steps 301 and 302. In an embodiment, the distributed blockchain ledger transactions associated with steps 301 and 302 grant participants permission to execute transactions on the distributed blockchain ledger.

When participants are added at steps 301 and 302 they are issued encrypted access credentials as well as identification numbers 400 and 402 that are used for reference within the distributed blockchain ledger. The distributed blockchain ledger transactions associated with steps 301 and 302 add blocks to the historical blockchain 408. Subsequently, those transactions associated with steps 301 and 302 are synchronized with other copy of the distributed blockchain ledger independently managed by the other participants. When such synchronization occurs, a consensus protocol is created that enables each participant to act autonomously at any point in the workflow based on the provenance of the historical blockchain 408.

End users of the secure dispensing system place orders at step 304 using a mobile or web application to generate additional distributed blockchain ledger transactions that create asset records 404. Also created are schedule records 406 that define the terms of delivery and a dispense asset or assets 409 that define and record the history of a dispense process (e.g., status indicator(s) of one or more items associated with the order). In another embodiment of the secure dispensing system, an order at step 304 might be created by an intermediate party (e.g., an entity other than the end user) such as a parcel delivery service. Additionally, when a schedule 406 asset has been created, a dispense asset 409 can be created referencing the identification numbers 410 of the participants to the dispensing process as well as the schedule identification number. The dispense asset 409 records a current state of the dispense process.

At step 304, the state of the dispense asset 409 is set to a "Placed" state 414 by executing a distributed blockchain ledger transaction 412. Applications of the order fulfillment system 220 and order management systems 230 can interrogate their corresponding copies of the distributed blockchain ledger to learn about these state changes 414 and update their internal systems. The autonomy created by the distributed blockchain ledgers enables these systems to optimize operations, and in some embodiments of the secure dispensing system determine that external transactions should be executed such as financial compensation, change of ownership, change of liability, etc.

Referring again to FIG. 4, when the order is being prepared by a preparer system (e.g., preparer system 240 of FIGS. 2 and/or 3) a distributed blockchain ledger transaction at step 306 would be executed to change the state of the dispense asset 409 to an "In-Process" state 416. When the order has been completely prepared by the preparer system, a distributed blockchain ledger transaction would be executed by the preparer system at step 308 to change the state of the dispense asset 409 to a "Ready" state 418. An application executing on a mobile device (e.g., mobile device 250 of FIGS. 2 and/or 3) of the end user independently synchronizes its copy of the distributed blockchain ledger with a copy of the distributed blockchain ledger independently managed by an order management system (e.g., order management system 230 of FIGS. 2 and/or 3). In an embodiment, such independent synchronization may be effectuated via cellular or Wi-Fi, or other type of wireless connection. Upon learning that the state of dispense asset 409 is set to "Ready" state 418, the application executing on the mobile device of the end-user will alert the end user that the order placed at step 304 is ready to be picked up at a physical location of the order fulfillment system.

Referring again to FIG. 4, when the completed order is loaded into the order fulfillment system by the preparer system, a distributed blockchain ledger transaction is executed by the preparer system at step 310 to change the state of dispense asset 409 to a "Loaded" state 420. As part of the loading process, a drawer number or other location indicator may be assigned by the order fulfillment system by updating a state 428 of the drawer number from "empty" to "filled". In an embodiment, updating the state 428 of the drawer number memorializes which drawer was loaded for the order placed at step 304 on the dispense process record.

When the mobile device of the end-user is in proximity to the order fulfillment system, the application of the mobile device checks the state of dispense asset 409. If the state of dispense asset 409 is "Loaded" state 420, the application completes any required secondary verification (e.g. age>21, QR Code Scan, etc.). If any required secondary verification is satisfied, the application then executes a distributed blockchain ledger transaction to change the state of dispense asset 409 to an "Authorized" state 422. The order fulfillment system may then synchronize its copy of the distributed blockchain ledger with the copy of the distributed blockchain ledger managed by the application executing on the mobile device of the end user via Wi-Fi or BLE or other type of wireless connection. Upon learning that the state of dispense asset 409 is set to the "Authorized" state 422, the order fulfillment system executes a distributed blockchain ledger transaction at step 314 to change the state of dispense asset 409 to a "Deliver" state 424. The order fulfillment system may also use internal systems and mechanisms of the order fulfillment system to autonomously provide access to the item (e.g., by opening a drawer of the container containing the item).

In an embodiment, when the order fulfillment system determines by various means (e.g. beam break, weight difference, etc.) that the container has been emptied or the item otherwise dispensed or accessed, the order fulfillment system executes a distributed blockchain ledger transaction at step 316 to change the state of dispense asset 409 to a "Delivered" state 426. Through synchronization of the distributed blockchain ledger, all participants learn that the order was completed, and the item delivered, when the state of dispense asset 409 is changed to the "Delivered" state 426. External order management systems would record the change and completed status.

Accordingly, through process 300, the secure dispensing system ensures that the order fulfillment system facilitates efficient self-service customer retrieval of goods, including remotely-purchased and/or remotely-ordered goods. Additionally, all participants in the business network, and in a specific dispense asset 409 can work more efficiently via the autonomy provided by independently managed copies of a distributed blockchain ledger implemented by the secure dispensing system. In particular, operation of the order fulfillment system is enhanced through such autonomy provided by those independently managed copies of the distributed blockchain ledger. Applications executing on participant systems are also more efficient. For example, such applications can discover the progress of particular work processes related to a dispensing process by independently querying their synchronized copy of the distributed blockchain ledger.

FIGS. 5-9 depict a swimlane diagram illustrating an example implementation of the processes depicted in FIGS. 1 and 4, as performed by participants of a secure dispensing system such as the secure dispensing system 205 of FIG. 3. In FIGS. 5-9, various steps of the example implementation are shown as being performed by various participants of secure dispensing system 205. Those various participants include: an order fulfillment system 220, an order management system 230, a preparer system 240, and a mobile device 250 of an end-user.

In the example of FIGS. 5-9, synchronization is present between respective copies of distributed blockchain ledger 210 when steps representing transactions and entries made to the distributed blockchain ledger 210 are located within the swimlane associated with distributed blockchain ledger 210. Synchronization is not present when such steps are located within other swimlanes of the example swim lane diagram depicted by FIGS. 5-9. In the example of FIGS. 5-9, a participant is considered to be operating autonomously when synchronization is not present.

Individual copies of the distributed blockchain ledger 210 maintained by the participants are not separately shown, as each copy of the distributed blockchain ledger 210 will synchronize, whether passively or actively, with other copies of the distributed blockchain ledger 210 so that all participants in the system have a synchronized copy of the distributed blockchain ledger 210. In an embodiment, each participant system (e.g., systems 220, 230, 240, and/or 250) is a peer on the distributed blockchain ledger 210 and maintains a copy that is opportunistically synchronized with other using a data synchronization protocol (e.g., HyperLedger Fabric Gossip) implemented for use with the distributed blockchain ledger 210 to ensure that each copy is identical and in consensus between the participants (or peers). In an embodiment, a copy of the distributed blockchain ledger 210 managed by an application executing on mobile device 250 may be synchronized with any other participant's copy of the distributed blockchain ledger 210 running on a server system. In an embodiment, the copy of the distributed blockchain ledger 210 running on the server system may be accessed via the Internet, a private or local area network, a cellular connection or Wi-Fi connection.

Figure 5:
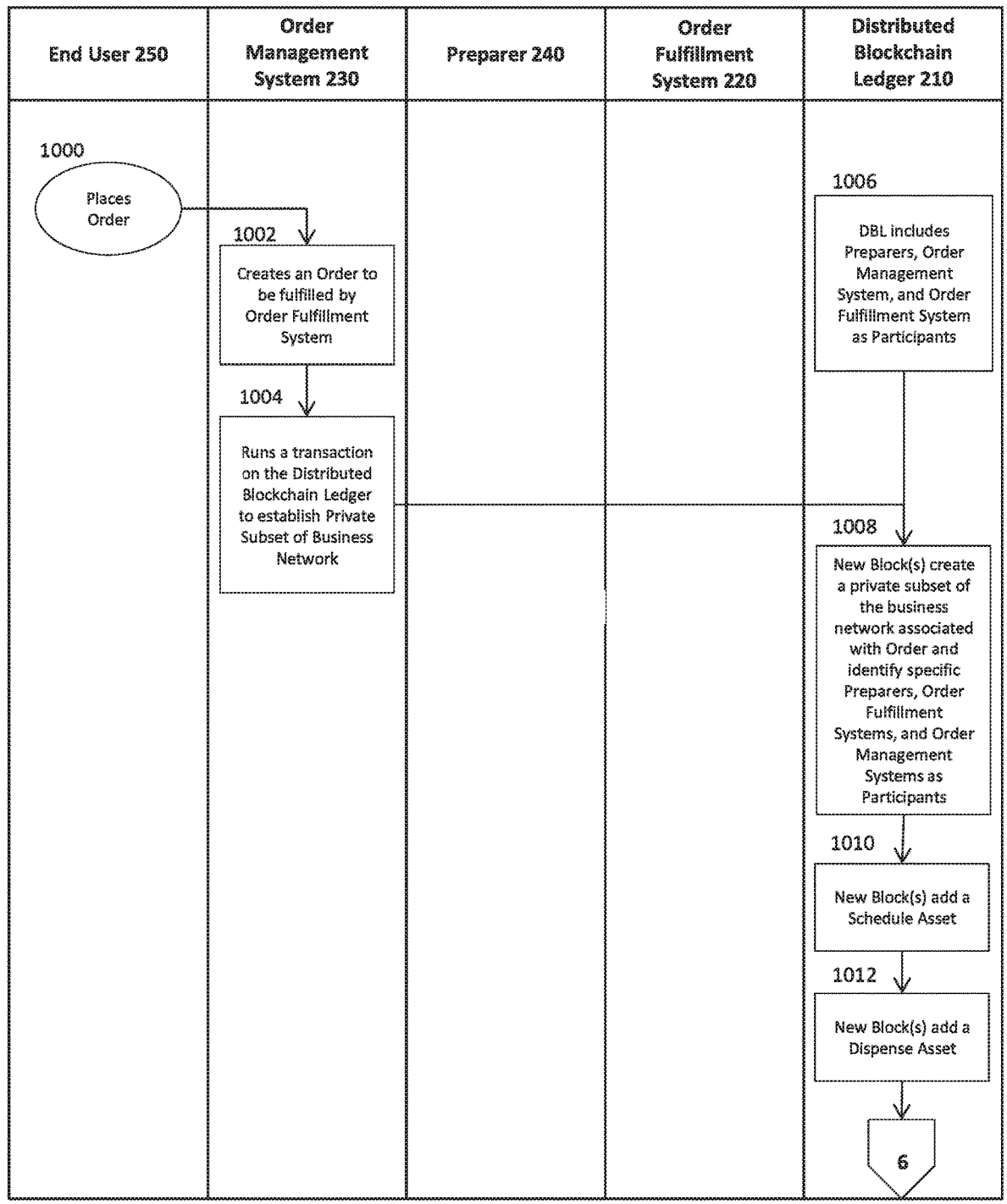
FIGS. 5-9 are flow diagrams detailing processes performed by one or more components of the systems of FIGS. 2 and 3, in accordance with embodiments of the invention.

With reference to FIG. 5, an end user places an order on the order management system 230, at step 1000. At step 1002, the order management system 230 creates an order to be fulfilled by the order fulfillment system 220. In an embodiment, the order management system 230 operates on a server system that may be accessed by the end user via the Internet using an Internet browser executing on a computer workstation or mobile device. The order management system 230 receives information provided by the end user in placing the order including identification of the end user, payment information, and shipment or delivery information. In an embodiment, the order is designated by the end user to be delivered through the order fulfillment system 220. In an embodiment, the order is designated by the order management system 230 to be delivered through the order fulfillment system 220.

At step 1004, the order management system 230 responds to the new order placed at step 1000 by executing a transaction on the server system hosting and storing a copy of the distributed blockchain ledger 210. The transaction executed at step 1004 creates a new block in the distributed blockchain ledger 210 at step 1008 adding a new private subset of the business network related only to the end user associated with mobile device 250 and the order. In an embodiment, the new block created in the distributed blockchain ledger 210 at step 1008 also records the addition of the end user 250 as a participant in the private business network defined by the distributed blockchain ledger 210.

At step 1010, the transaction executed at step 1004 also adds a new block the distributed blockchain ledger 210 that records the addition of a schedule asset. The schedule asset recorded at step 1010 defines terms and conditions of the order. Such terms and conditions may include: price, items, delivery date, delivery time, delivery handling instructions (e.g., temperature of the container), and the like. At step 1012, another block is added to the distributed blockchain ledger 210 by the transaction executed at step 1004. The block added at step 1012 records the addition of a dispense asset. The dispense asset includes: encrypted identification of the participants (e.g., mobile device 250, preparer system 240, order fulfillment system 220, and/or order management system 230), a historical record of all transactions associated with the dispensing process corresponding to the order, and a state of a status indicator defining a current status of the dispensing process. The state of the status indicator is set to a "Placed" state, at step 1012, indicating that the order has been placed by an end user associated with mobile device 250.

Figure 6:
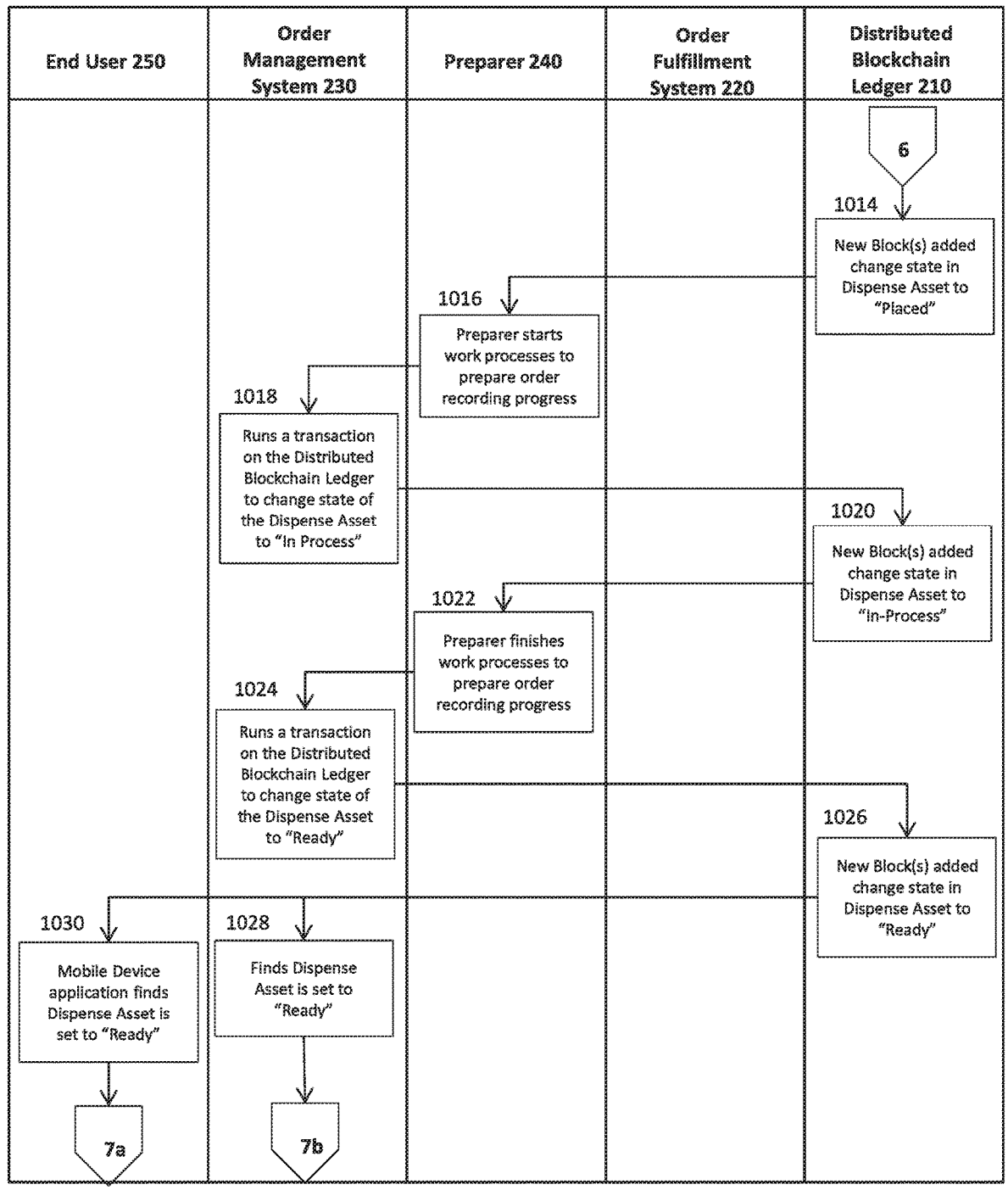

With reference to FIG. 6, setting the state of the status indicator to the "Placed" state is synchronized with a copy of the distributed blockchain ledger 210 managed by the preparer system 240, at step 1014. At step 1016, the preparer system 240 starts the work processes to prepare the order by entering information that is transmitted to the order management system 230. At step 1018, the order management system 230 executes a transaction that adds a new block to its copy of the distributed blockchain ledger 210 that changes the state of the status indicator to an "In-Process" state. At step 1020, synchronization occurs among the independently managed copies of the distributed blockchain ledger 210 to reflect the change of the status indicator to the "In-Process" state.

At step 1022, the preparer system 240 completes the work processes to prepare the order and transmits information to the order management system 230 identifying the work processes as complete. At step 1024, the order management system 230 executes a transaction that adds a new block to its copy of the distributed blockchain ledger 210 that changes the state of the status indicator to a "Ready" state. At step 1026, synchronization occurs among the independently managed copies of the distributed blockchain ledger 210 to reflect the change of the status indicator to the "Ready" state.

Figure 7:
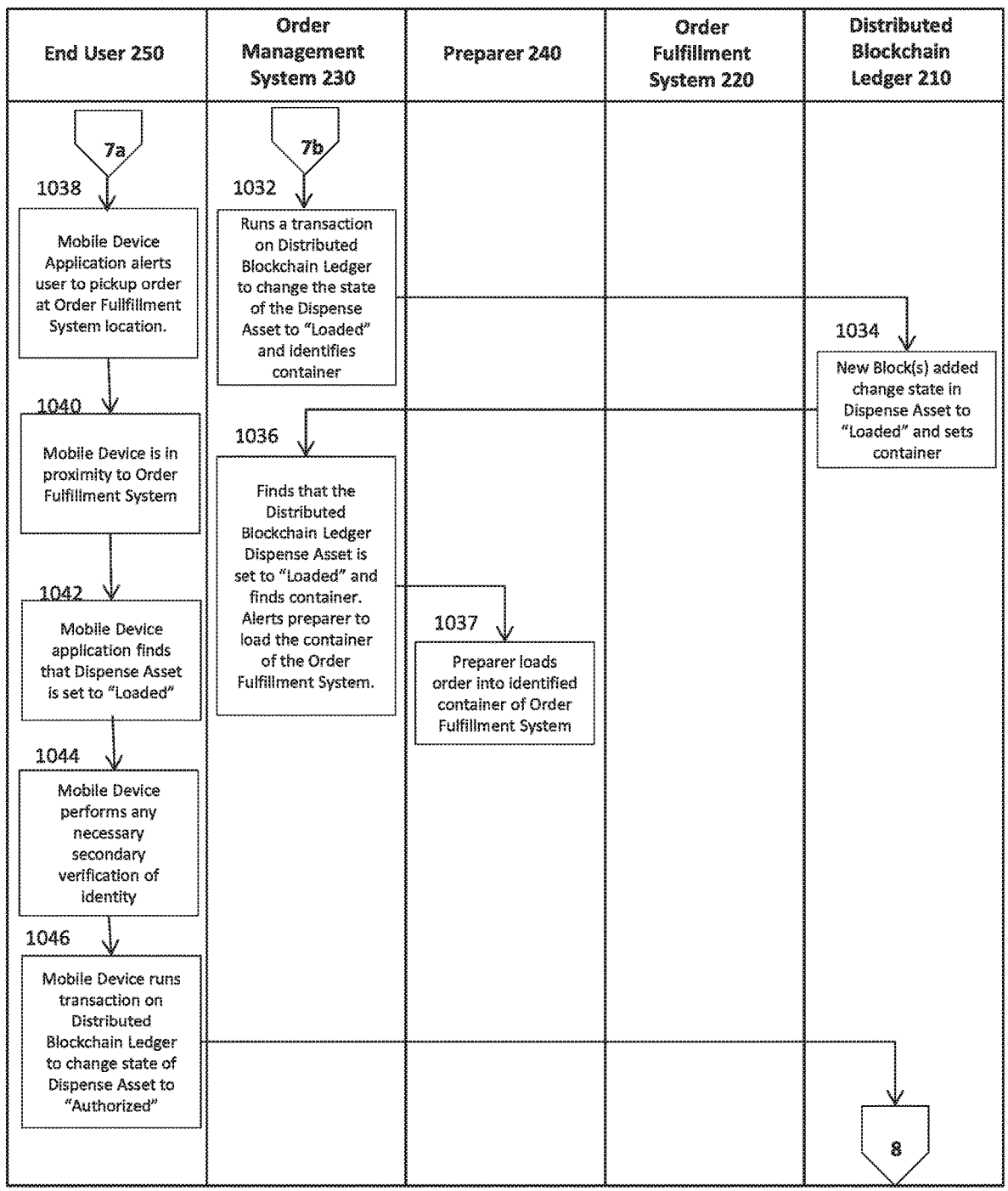

At step 1030, upon synchronizing its copy of the distributed blockchain ledger 210, the application executing on mobile device 250 determines that the state of the status indicator is set to the "Ready" state. As seen in FIG. 7, responsive to that determination in step 1030, the application executing on mobile device 250 provides an alert, at step 1038, informing the end user that the item is ready to be dispensed at a physical location of the order fulfillment system 220. With reference to FIG. 6, in an embodiment, order management system 230 confirms consensus among participants regarding the "Ready" state of the status indicator following synchronization, at step 1028.

Returning to FIG. 7, at step 1032, order management system 230 executes a transaction adding a new block to its copy of the distributed blockchain ledger 210 that changes the state of the status indicator to a "Loaded" state. The new block added by the transaction executed at step 1032 also identifies a particular container (or containers) of the order fulfillment system 220 to be used to hold the item(s) for dispensing. At step 1034, synchronization occurs among the independently managed copies of the distributed blockchain ledger 210 to reflect the change of the status indicator to the "Loaded" state and the identification of the particular container.

At step 1036, the order management system 230 confirms consensus among participants following synchronization and sends an alert to preparer system 240 to load the item(s) into the identified container(s) of the order fulfillment system 220. At step 1037, responsive to the alert, preparer system 240 loads the item(s) for the order into the identified container(s) of the order fulfillment system 220.

At step 1040, a determination is made that mobile device 250 is proximate to a physical location of order fulfillment system 220. At step 1042, the application executing on mobile device 250 verifies that the status indicator is in the "Loaded" state using its copy of distributed blockchain ledger 210. At step 1044, the application executing on mobile device 250 performs any secondary verification of identity of the end user that may be required. At step 1046, once any required secondary verification has been completed successfully, the application of mobile device 250 executes a transaction that adds a new block to its copy of distributed blockchain ledger 210 that changes the state of the status indicator to an "Authorized" state.

Figure 8:
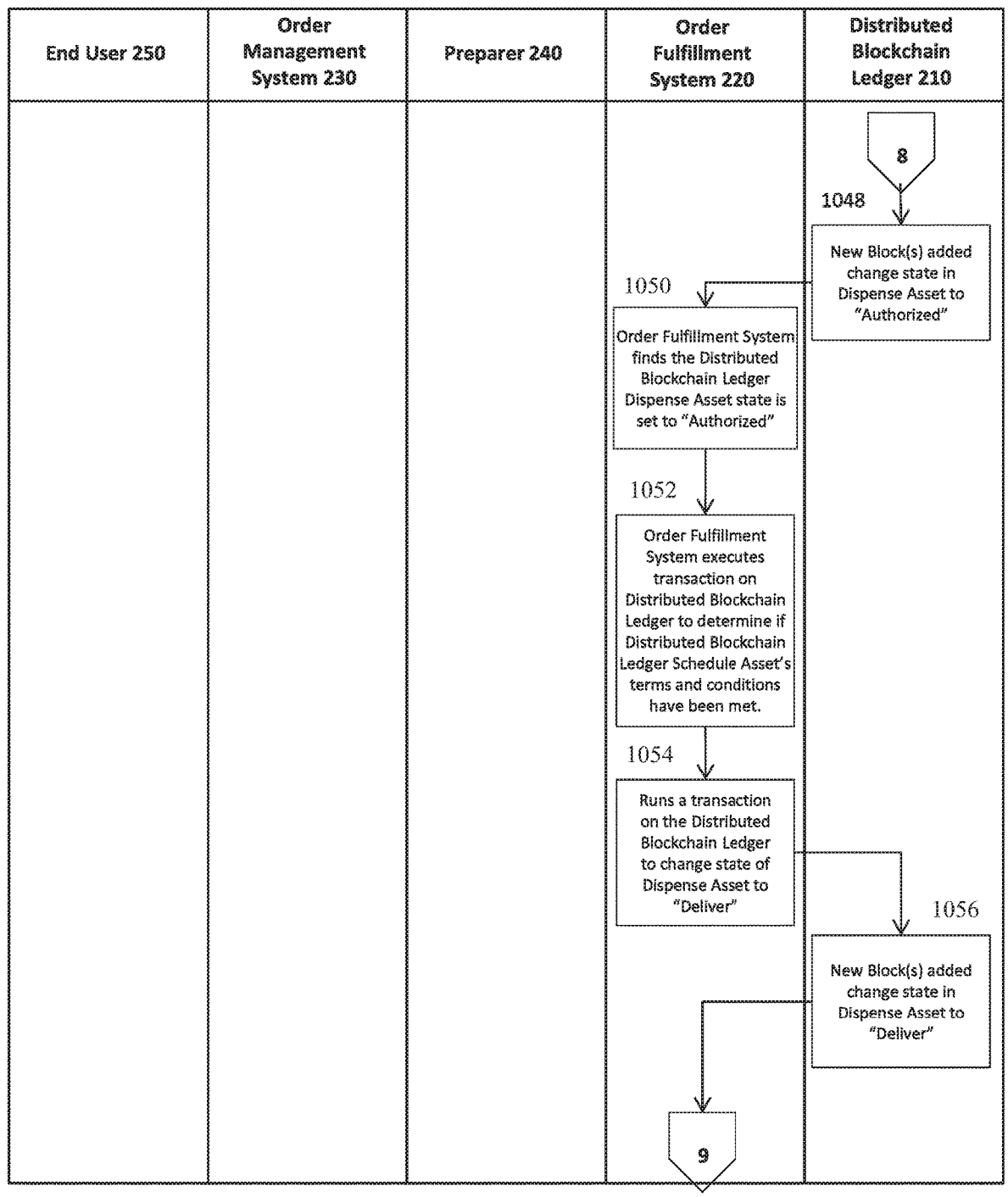

With reference to FIG. 8, synchronization occurs among the independently managed copies of the distributed blockchain ledger 210 to reflect the change of the status indicator to the "Authorized" state, at step 1048. In an embodiment, prior to occurrence of synchronization at step 1048, order fulfillment system 220 synchronizes its copy of distributed blockchain ledger 210 with the respective copy managed by the application executing on mobile device 250 using a personal area network (such as a Bluetooth Low Energy beacon) or Wi-Fi. In an embodiment, the personal area network or Wi-Fi used by order fulfillment system 220 to directly synchronization its copy of distributed blockchain ledger 210 with the respective copy of mobile device 250 is effectuated using a processor of an embedded computing device. In an embodiment, order fulfillment system 220 directly synchronizes a locally stored copy of distributed blockchain ledger 210 with the respective copy of mobile device 250. By way of example, the locally stored copy of distributed blockchain ledger 210 resides in memory and storage media within the order fulfillment system 220, as depicted and described in FIG. 10.

At step 1050, order fulfillment system 220 queries its copy of distributed blockchain ledger and determines that the status indicator is in the "Authorized" state. At step 1052, the order fulfillment system 220 executes a transaction on its copy of the distributed blockchain ledger 210 to ensure that each of the terms and conditions defined by the schedule asset have been met. At step 1054, responsive to a determination that each of those terms and conditions have been met, the order fulfillment system 220 executes a transaction that adds a new block to its copy of the distributed blockchain ledger 210 that changes the state of the status indicator to a "Deliver" state. At step 1056, synchronization occurs among the independently managed copies of the distributed blockchain ledger 210 to reflect the change of the status indicator to the "Deliver" state.

Figure 9:
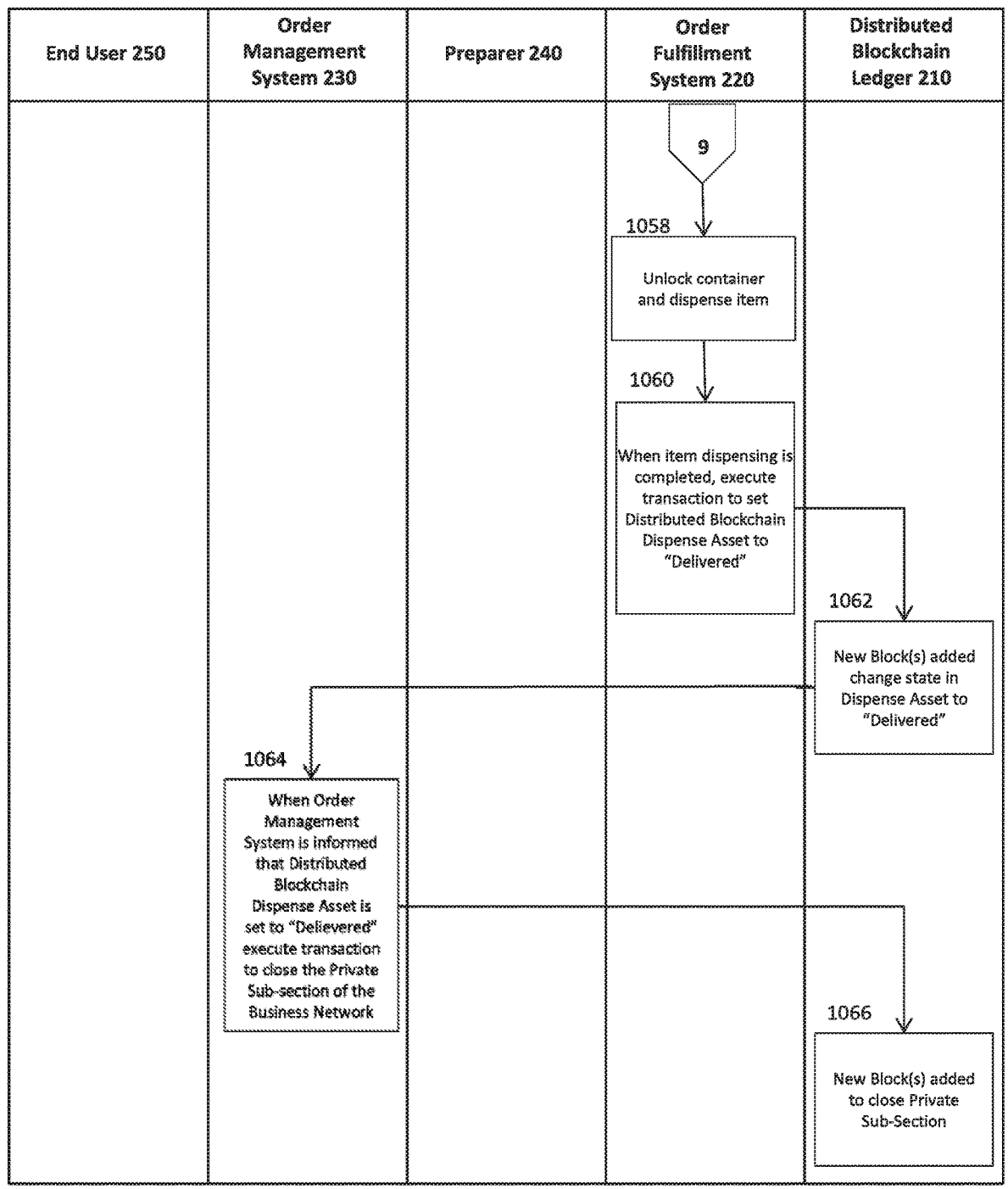

With reference to FIG. 9, order fulfillment system 220 autonomously provides access to the item(s), at step 1058. In the example of FIG. 9, order fulfillment system 220 autonomously provides access to the item(s) by transitioning a locking mechanism coupled to the container from a locked state to an unlocked state thereby unlocking the container and dispensing the item. In an embodiment, order fulfillment system 220 autonomously provides access to the item(s)

without obtaining (or confirming) consensus among participants regarding the "Deliver" state of the status indicator. In this embodiment, order fulfillment system 220 internally decides to autonomously provide access to the item(s) using onboard computing resources. In an embodiment, step 1058 occurs prior to the occurrence of synchronization at step 1056. In an embodiment, order fulfillment system 220 autonomously provides access to the item(s) upon obtaining (or confirming) consensus among participants regarding the "Deliver" state of the status indicator.

At step 1060, order fulfillment system 220 executes a transaction that adds a new block to its copy of the distributed blockchain ledger 210 that changes the state of the status indicator to a "Delivered" state. In an embodiment, order fulfillment system 220 executes the transaction at step 1060 responsive to a determination that the item is external to the container. In an embodiment, in addition to executing the transaction at step 1060, order fulfillment system 220 eliminates access to an area within the container. By way of example, order fulfillment system 220 may close a door or drawer associated with the container, transition a locking mechanism coupled to the container from an unlocked state to a locked state, activity sensors that monitor for unauthorized access within the container, and the like.

At step 1062, synchronization occurs among the independently managed copies of the distributed blockchain ledger 210 to reflect the change of the status indicator to the "Delivered" state. At step 1064, order management system 230 queries its copy of distributed blockchain ledger 210 and determines that the status indicator is in the "Delivered" state. Responsive to that determination, order management system 230 executes a transaction, at step 1064, that adds a new block to its copy of distributed blockchain ledger 210 to close the private subset of the business network added in step 1008.

In an embodiment, responsive to a determination that at least one of the terms and conditions defined by the schedule asset is unmet, the order fulfillment system 220 executes a transaction that adds a new block to its copy of the distributed blockchain ledger 210. The new block added in this embodiment changes the state of the status indicator to an "Aborted" state. When the state of the status indicator is the "Aborted" state, the order fulfillment system 220 enters an error routine. As part of the error routine, the order fulfillment system 220 provides an indication that signals to the end user that a problem with the order has been detected. In an embodiment, the indication includes data that directs the end-user to customer service for further information concerning the problem. Such customer service may include: live customer service proximate to the physical location of the order fulfillment system 220, a phone number, a website, and the like.

Additionally, order fulfillment system 220 withholds access to the item(s) when the state of the status indicator is the "Aborted" state. One skilled in the art may recognize that other error states can be encountered during the dispensing process that causes the order fulfillment system 220 to withhold access to the item. For example, after the status indicator is changed to the "Loaded" state, a determination may be made that an incorrect item(s) has been loaded into the identified container, the item(s) were loaded into the incorrect container, and the like. One skilled in the art may also recognize that any system associated with the dispensing process may trigger an error state. For example, the determination of the previous example may cause preparer system 240 to trigger an error state.

An order fulfillment system 220 as disclosed herein can be utilized to enable or facilitate the transfer of any of a variety of products, items or the like. The system can be utilized in conjunction with nearly any type of product, item or the like so long as such product, item or the like can be physically accommodated in the system, including but not limited to: food, beverages, groceries, pharmaceuticals, retail merchandise, parts, components, work pieces, hardware, and the like. In one case a product, item or the like is transferred from or between two users or parties, termed a "stocking" party and a "retrieving" party herein. In many cases title/ownership of the product, item or the like is being, has been or will be transferred from the stocking party to the retrieving party, such as in a sale transaction. However, the system may also be used in some cases in a lending or leasing arrangement and/or to return a product to the stocking party in a return transaction, and/or title may not necessary transfer.

By way of example only, the secure dispensing systems described herein may be used to securely dispense pharmaceutical orders in a hospital setting. For example, a medical professional may place an order, via a mobile device, a prescription medication for a patient. The order is sent to an order management system, as described in FIGS. 4-9, which records the order and sends instructions to a preparer, such as a hospital pharmacist, to prepare and load the ordered prescription into a locked cabinet for pickup. Once the prescription has been prepared and placed in the locked cabinet, the medical professional or an authorized third party goes to the locked cabinet with an authorized mobile device. The locked cabinet, connected to the order fulfillment system, verifies that the mobile device is authorized to unlock the cabinet, and may require the user to conduct a secondary verification process to authorize dispensation. Upon verification, the order fulfillment system unlocks the cabinet for the user and allows the prescription to be dispensed. The distributed blockchain ledger shared among the systems records the order by the medical professional, tracks the filling and loading of the prescription into the locked cabinet, authorization to unlock the cabinet for an authorized end-user, and the unlocking and dispensing of the prescription.

It will be appreciated that the basic principles of the secure dispensing system 200, 205 may be implemented in a variety of manners that depart in certain ways from the embodiments expressly depicted herein. For example, in a case involving parcel delivery a participant responsible for delivery, or a deliverer, may be an additional participant in the business network, altering the process. For example, multiple end-users could be involved in one dispensing process, or multiple drawers in an order fulfillment system containing the contents of a single dispense process could be involved. For example, the order fulfillment system could be a single, secure, computer-controlled container. For example, the container could be conveyed via a person or a mobile robot tasked with controlling the security of the container.

Figure 10:
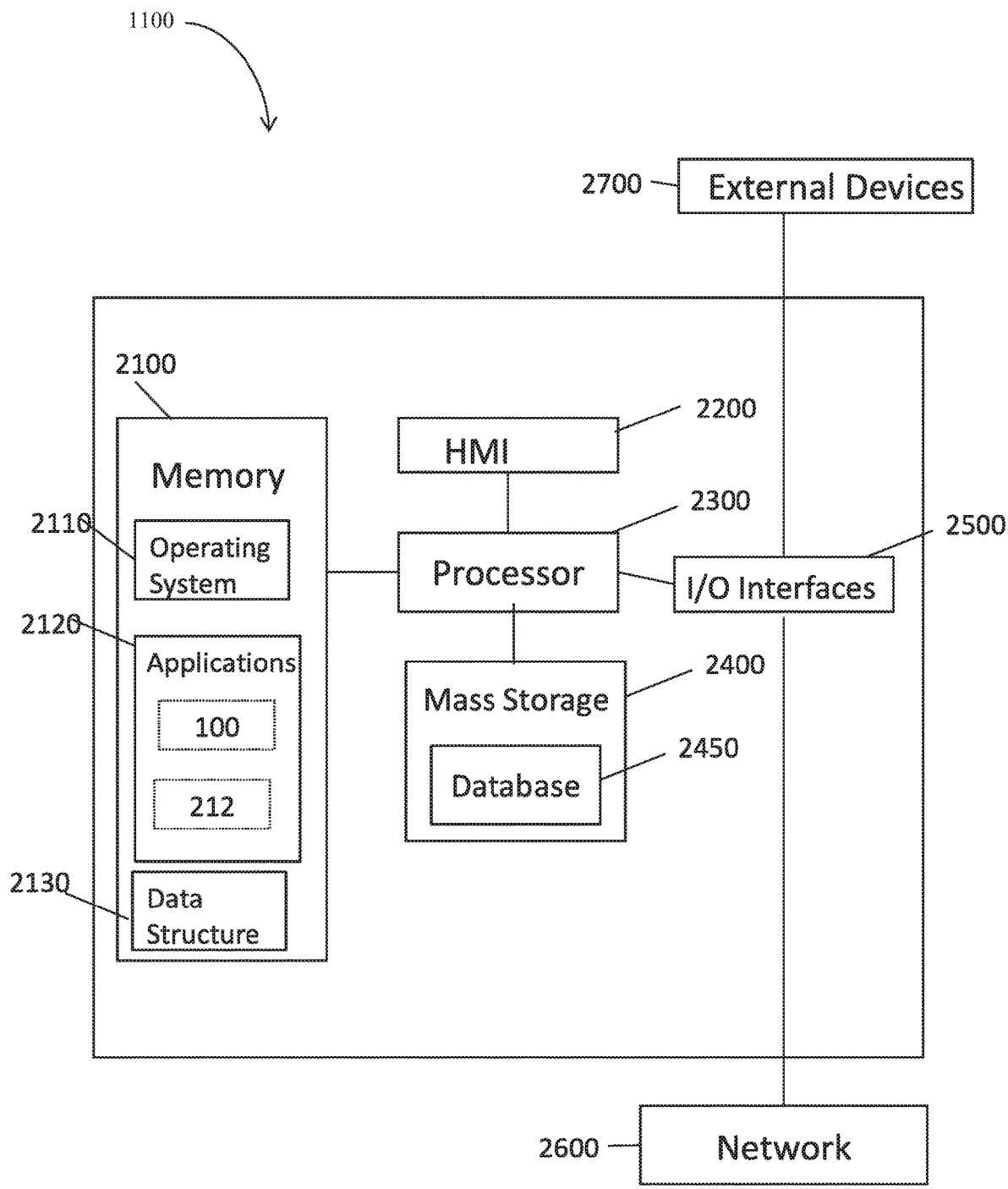
FIG. 10 an exemplary schematic block diagram of a computer system capable of performing one or more of the processes of FIG. 1, FIG. 4, and FIGS. 5-9.

Having described various embodiments of the invention, an exemplary computing environment suitable for implementing embodiments of the invention is now described. With reference to FIG. 10, order fulfillment system 220; computer device 222, 232, and 242; order management system 230; preparer system 240; mobile device 250 may be implemented on one or more computer devices or systems, such as exemplary computer system 1100.

Computer system 1100 includes processor(s) 2300, memory 2100, mass storage memory device 2400 that includes a database 2450, one or more input/output (I/O) interfaces 2500, and Human Machine Interface (HMI) 2200. The computer system 1100 may be operatively coupled to a network 2600 and other external devices 2700, as depicted in FIG. 10, via one or more I/O interfaces 2500. The processor 2300 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 2100. Memory 2100 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 2400 includes data storage devices such as a hard drive, optical drive, tape drive, volatile or non-volatile solid state device, or any other device capable of storing information. The processor 2300 operates under the control of an operating system 2110 that resides in memory 2100. The operating system 2110 manages processing resources so that computer program code embodied as one or more computer software applications, such as an application 2120 residing in memory 2100, has instructions executed by the processor 2300. In an alternative embodiment, the processor 2300 executes the application 2120 directly, in which case the operating system 2110 may be omitted. One or more data structures 2130 may also reside in memory 2100, and may be used by the processor 2300, operating system 2110, or application 2120 to store or manipulate data.

The I/O interface 2500 provides a machine interface that operatively couples the processor 2300 to other devices and systems, such as the network 2600 and other devices 2700. The application 2120, which includes data comprising program code for execution by processor 2300 to perform computer-implemented methods (e.g., method 100 of FIG. 1), thereby works by communicating via the I/O interface 2500 to provide the various features, functions, applications, processes, or modules comprising embodiments of the invention. The application 2120 may also include a copy (e.g., copies 212, 214, 216, and/or 218) of a distributed blockchain ledger associated with a dispensing system, as described herein. The application 2120 may also include coding and logic for creating, receiving, and/or transmitting distributed blockchain ledger transaction blocks, as described herein. The application 2120 may have program code that is executed by, for example, other system or network components external to the computer system 1100. Indeed, given the nearly endless hardware and software configurations possible, persons having ordinary skill in the art will understand that embodiments of the invention may include applications that are located externally to the computer system 1100, distributed among multiple computers or other external resources, or provided by computing resources (hardware and software) that are provided externally to computer system 222.

The HMI 2200, if included, is operatively coupled to the processor 2300 of computer system 1100 in a known manner to allow a user to interact directly with the computer system 1100. The HMI 2200 may include video or alphanumeric displays, a touch screen, a speaker, and any other suitable audio and visual indicators capable of providing data to the user. The HMI 2200 may also include input devices and controls such as an alphanumeric keyboard, a pointing device, keypads, pushbuttons, control knobs, microphones, etc., capable of accepting commands or input from the user and transmitting the entered input to the processor 2300.

A database 2450 residing on the mass storage memory device 2400 may be used to collect and organize data used by the various systems and modules described herein. The database 2450 may include data and supporting data structures that store and organize the data. In particular, the database 2450 may be arranged with any database organization or structure including, but not limited to, a relational database, a hierarchical database, a network database, or combinations thereof. A database management system in the form of a computer software application executing as instructions on the processor 2300 may be used to access the information or data stored in records of the database 2450 in response to a query, where a query may be dynamically determined and executed by the operating system 2110, other applications 2120, or one or more modules.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for autonomously dispensing items, the method comprising:
   receiving, by a dispensing system, a first distributed ledger transaction associated with a distributed blockchain ledger that i) identifies an item, ii) identifies a container associated with and containing the item, iii) includes a status indicator in a first state identifying the item as present in the container, and iv) includes an authorization code associated with a mobile device, wherein the item is a physical item, and the dispensing system includes a plurality of participants that are each configured to independently manage a copy of the distributed blockchain ledger and to synchronize each copy of the distributed blockchain ledger with other copies of the distributed blockchain ledger;
   receiving the authorization code from the mobile device;
   creating, by the dispensing system, a second distributed ledger transaction based on the first distributed ledger transaction that changes the status indicator to a second state identifying the item as authorized for dispensing;
   responsive to the creation of the second distributed ledger transaction, autonomously providing access to the item, wherein autonomously providing access to the item comprises transitioning a locking mechanism associated with the container from a locked state to an unlocked state;
   creating, by the dispensing system, a third distributed ledger transaction based on the second distributed ledger transaction that changes the status indicator to a third state identifying the item as dispensed; and
   autonomously providing, by the dispensing system, access to the plurality of participants with to a synchronized copy of the distributed blockchain ledger.

2. The method of claim 1, wherein each copy of the distributed blockchain ledger passively synchronizes with other copies of the distributed blockchain ledger.

3. The method of claim 1, wherein synchronization occurs between each copy of the distributed blockchain ledger using push synchronization, pull synchronization, opportunistic synchronization, or a combination thereof.

4. The method of claim 1, wherein the third distributed ledger transaction is created responsive to a determination that the item is external to a void defined by the container.

5. The method of claim 1, wherein the authorization code is received from an application executing on the mobile device responsive to a determination by the application that the status indicator is in the first state.

6. The method of claim 1, wherein the authorization code is received from an application executing on the mobile device subsequent to the application completing a secondary verification process.

7. The method of claim 1, further comprising:
establishing a private network of participants specific to an order for the item using a distributed blockchain ledger.

8. The method of claim 7, wherein the private network of participants is closed upon detecting the change of the status indicator to the third state.

9. A system comprising:
a dispensing system;
a processor operatively connected to the dispensing system; and
a memory operatively connected to the processor, the memory comprising program code that upon execution by the processor cause the system to perform operations that include:
receiving, by the dispensing system, a first distributed ledger transaction associated with a distributed blockchain ledger that i) identifies an item, ii) identifies a container associated with and containing the item, iii) includes a status indicator in a first state identifying the item as present in the container, and iv) includes an authorization code associated with a mobile device, wherein the item is a physical item, and the dispensing system includes a plurality of participants that are each configured to independently manage a copy of the distributed blockchain ledger and to synchronize each copy of the distributed blockchain ledger with other copies of the distributed blockchain ledger;
receiving the authorization code from the mobile device;
creating, by the dispensing system, a second distributed ledger transaction based on the first distributed ledger transaction that changes the status indicator to a second state identifying the item as authorized for dispensing;
responsive to the creation of the second distributed ledger transaction, autonomously providing access to the item, wherein autonomously providing access to the item comprises transitioning a locking mechanism associated with the container from a locked state to an unlocked state;
creating, by the dispensing system, a third distributed ledger transaction based on the second distributed ledger transaction that changes the status indicator to a third state identifying the item as dispensed; and
autonomously providing to the plurality of participants, by the dispensing system, access to a synchronized copy of the distributed blockchain ledger.

10. The system of claim 9, wherein autonomously providing access to the item comprises:
detecting, by an order fulfillment system, the change of the status indicator to the second state using the synchronized copy of the distributed blockchain ledger.

11. The system of claim 10, wherein the container and the order fulfillment system comprise a single apparatus.

12. The system of claim 10, wherein the order fulfillment system is physically remote from an apparatus comprising the container.

13. The system of claim 9, wherein a private network of participants specific to an order for the item is closed in response to detecting the change of the status indicator to the third state.

14. The system of claim 13, wherein each participant of the private network of participants independently manage a copy of a distributed blockchain ledger defining the private network of participants.

15. The system of claim 9, wherein the authorization code is received when the mobile device is brought within a predefined proximity of an order fulfillment system.

16. The system of claim 9, wherein the mobile device is a participant in a private network of participants defined by a distributed blockchain ledger.

17. The system of claim 9, wherein each participant in a private network of participants defined in a distributed blockchain ledger is assigned a unique identifier and issued encrypted access credentials when added to the private network of participants.

18. A non-transitory computer-readable storage medium comprising computer-readable instructions that upon execution by a processor of a computing device cause the computing device to:
receive, by a dispensing system, a first distributed ledger transaction associated with a distributed blockchain ledger that i) identifies an item, ii) identifies a container associated with and containing the item, iii) includes a status indicator in a first state identifying the item as present in the container, and iv) includes an authorization code associated with a mobile device, wherein the item is a physical item, and the dispensing system includes a plurality of participants that are each configured to independently manage a copy of the distributed blockchain ledger and to synchronize each copy of the distributed blockchain ledger with other copies of the distributed blockchain ledger;
receive the authorization code from the mobile device;
create, by the dispensing system, a second distributed ledger transaction based on the first distributed ledger transaction that changes the status indicator to a second state identifying the item as authorized for dispensing;
responsive to the creation of the second distributed ledger transaction, autonomously provide access to the item, wherein autonomously providing access to the item comprises transitioning a locking mechanism associated with the container from a locked state to an unlocked state;
create, by the dispensing system, a third distributed ledger transaction based on the second distributed ledger transaction that changes the status indicator to a third state identifying the item as dispensed; and
autonomously provide, by the dispensing system, access to the plurality of participants to a synchronized copy of the distributed blockchain ledger.

* * * * *

UNITED STATES PATENT AND TRADEMARK OFFICE
CERTIFICATE OF CORRECTION

| | | |
|---|---|---|
| PATENT NO. | : 11,636,459 B2 | Page 1 of 1 |
| APPLICATION NO. | : 16/553748 | |
| DATED | : April 25, 2023 | |
| INVENTOR(S) | : Edward A. Fullman et al. | |

It is certified that error appears in the above-identified patent and that said Letters Patent is hereby corrected as shown below:

In the Claims

Column 16, Line 66 reads:
"…claim 1, plurality of participants with to a syn-…"
Should read:
--…claim 1, plurality of participants to a syn-…--

Signed and Sealed this
Sixth Day of June, 2023

Katherine Kelly Vidal
*Director of the United States Patent and Trademark Office*